(12) United States Patent
Swan

(10) Patent No.: US 12,448,961 B2
(45) Date of Patent: Oct. 21, 2025

(54) FLUID RECOVERY SYSTEM

(71) Applicant: Randy Swan, Granbury, TX (US)

(72) Inventor: Randy Swan, Granbury, TX (US)

(*) Notice: Subject to any disclaimer, the term of this patent is extended or adjusted under 35 U.S.C. 154(b) by 351 days.

(21) Appl. No.: 18/101,634

(22) Filed: Jan. 26, 2023

(65) Prior Publication Data

US 2023/0175498 A1    Jun. 8, 2023

Related U.S. Application Data

(63) Continuation-in-part of application No. 17/075,177, filed on Oct. 20, 2020, now Pat. No. 11,585,334.

(51) Int. Cl.
| | |
|---|---|
| F04B 39/16 | (2006.01) |
| B01D 47/00 | (2006.01) |
| B01D 53/18 | (2006.01) |
| F01M 13/04 | (2006.01) |

(52) U.S. Cl.
CPC ............ F04B 39/16 (2013.01); B01D 47/00 (2013.01); B01D 53/18 (2013.01); *F01M 2013/045* (2013.01)

(58) Field of Classification Search
CPC .......... F04B 39/16; F04B 41/06; F04B 41/02; B01D 47/00; B01D 53/18; F01M 2013/045
USPC ........................................................... 73/40
See application file for complete search history.

(56) References Cited

U.S. PATENT DOCUMENTS

| | | | |
|---|---|---|---|
| 5,516,119 A | * | 5/1996 | Trackwell ............. F16J 15/004 277/409 |
| 10,941,643 B2 | | 3/2021 | Swan |
| 11,248,746 B2 | | 2/2022 | Robbins et al. |
| 2006/0042719 A1 | | 3/2006 | Templet et al. |
| 2007/0151292 A1 | | 7/2007 | Heath et al. |
| 2018/0100385 A1 | | 4/2018 | Elmer |

FOREIGN PATENT DOCUMENTS

| | | |
|---|---|---|
| CN | 203906227 U | 10/2014 |
| KR | 20140096443 A | 8/2014 |

OTHER PUBLICATIONS

TESCorp strikes back, against methane, Compressortech2, Nov. 2020.

* cited by examiner

*Primary Examiner* — Peter J Macchiarolo
*Assistant Examiner* — John M Royston
(74) *Attorney, Agent, or Firm* — Brian K. Yost; Decker Jones, PC

(57) ABSTRACT

A fluid recovery system comprises a vapor recovery unit, control system, vent line, main vapor recovery unit inlet line, and a discharge line. The vapor recovery unit comprises a vapor recovery vessel and a vapor recovery compressor comprising a motor. The main vapor recovery unit inlet line is fluidly connected to the vapor recovery vessel. The vent line comprises a valve adapted to regulate packing case vapor flow through the vent line to the main vapor recovery unit inlet line. In certain embodiments the fluid recovery system comprises a gas scrubber tank, or a receiver tank, or gas-actuated control components. In certain embodiment, the system recovers vent gas, blow-by gas, or liquids or other fluids. In certain embodiment, the receiver tank receives fluids entrained in packing case vents and separates the fluid into liquids and vapor.

19 Claims, 2 Drawing Sheets

FLUID RECOVERY SYSTEM

This application is a continuation-in-part of and claims the benefit of U.S. patent application Ser. No. 17/075,177 filed Oct. 20, 2020, the contents of which are incorporated herein in their entirety.

BACKGROUND OF THE INVENTION

1. Field of the Invention

The present invention relates generally to a fluid recovery system and specifically to a fluid recovery system and method adapted to recover vapors and other fluids from a reciprocating compressor and other fluid emitting components.

2. Description of the Prior Art

The largest portion of gas compression in the industry is done by double-acting reciprocating compressors. A double-acting compressor utilizes a rod that passes through a piston and compresses gases on both sides such that each side of the piston has a compression and suction stroke within a cylinder on each revolution of a crankshaft. The rod, attached to a crosshead, protrudes into the crankcase of the compressor which is at significantly lower pressure (i.e. atmosphere) than the pressure inside the cylinder. A packing case assembly is installed on the rod to prevent the high-pressure gas from escaping and still allow free movement of the piston rod assembly within the cylinder to do the compression work.

Packing cases are used in virtually all double-acting reciprocating compressors. As the packing does not completely seal off the cylinder however, a small amount of gas will pass through the vent ports of the packing case as well as a small amount of lubricating oil if the case is lubricated. This vent has often been accepted as necessary and unpreventable. Thus, packing cases are a known source of fugitive gas emissions.

The prior art discloses certain efforts that have been made to contain packing case fugitive gas emissions. For example, U.S. Pat. App. No. US 2006/0042719, Templet et al. provides a gas recovery system adapted to recover gas emanating from packing seals of a gas compressor. The device comprises a jet compressor which receives high pressure motive gas, creating a vacuum that draws up the low-pressure vent gas.

By way of further example, U.S. Pat. App. No. US 2018/0100385, Elmer discloses a gas emissions recovery system adapted to receive fugitive gas emissions from a gas compressor using a double acting liquid piston compressor system, to pressurize the emissions. U.S. Pat. App. No. US 2007/0151292, Heath et al discloses a gas well vapor recovery system wherein gases collected are delivered to a vacuum chamber.

What is needed is a fluid recovery system that is simple, economical to build and operate, and which permits the recovery of fluids from reciprocating compressors and other compressor facility components.

SUMMARY OF THE INVENTION

The fluid recovery system (FRS) of the preferred embodiment generally comprises a reciprocating compressor comprising packing cases, packing vent lines leading from the reciprocating compressor to a main vapor recovery unit inlet line leading into a vapor recovery unit comprising a vapor recovery vessel and a vapor recovery compressor comprising a motor. The FRS of the preferred embodiment further comprises one or more valves adapted to regulate flow from the reciprocating compressor to the vapor recovery unit; a discharge line leading from the vapor recovery unit to sales or a reciprocating compressor inlet vessel. The reciprocating compressor inlet vessel is adapted to supply the reciprocating compressor through inlet lines.

The FRS of the preferred embodiment further comprises a control system. The control system of the preferred embodiment is a programmable logic controller (PLC) based controller adapted to monitor input devices and make program-based decisions to control output devices. The control system is adapted to monitor and control the vapor recovery unit and/or the motor which in certain embodiments, comprises a variable frequency drive communicatively linked to the control system via a motor control. In certain embodiments, the FRS further comprises an environmental tank and/or other components which may emit gas such as dump valves, regulators, pumps, and the like. The vapor recovery unit further comprises a pressure sensor/transducer adapted to transmit inlet pressure readings to the control system via communication conduit.

In operation, gas is fed from the reciprocating compressor inlet vessel through the inlet lines into the reciprocating compressor. The reciprocating compressor comprises a frame with packing cases positioned within throws. Conventional reciprocating compressor frames typically comprise between one to six throws, which will have a packing case within each throw having a cylinder installed. Gas accumulating within the packing cases is directed downstream towards the vapor recovery unit through the respective packing vent lines (which in prior art reciprocating compressors are normally open to atmosphere). The valves are positioned between the reciprocating compressor and vapor recovery unit. In the preferred embodiment, the valves are three-way ball valves installed on each separate packing vent line and are adapted to permit an operator to open the packing vent line back to atmosphere to physically check the rate of vent flow from the packing case.

The vapor recovery unit further comprises required sensors and hardware to operate the vapor recovery vessel, the vapor recovery compressor, and the motor. The vapor recovery vessel of the preferred embodiment comprises a controllable relief valve adapted to be configured to a setting that will permit gas to vent to atmosphere should a shutdown occur in the vapor recovery unit. This setting can be adjusted based on the operator's preference in order, for example, to maintain a packing case vent pressure within accepted operating parameters. These accepted operating parameters may be determined, for example by the reciprocating compressor manufacturer. In conventional reciprocating compressors, the acceptable packing case vent pressure is typically below 5 pounds per square inch gauge pressure (PSIG).

The vapor recovery compressor of the preferred embodiment is a conventional and commercially available small reciprocating or rotary type compressor adapted to operate with very low inlet pressure as well as low discharge pressure such that recovered gas can be routed back into the low pressure side of the FRS or the sales line.

The pressure sensor/transducer is used to monitor inlet pressure to the vapor recovery vessel and provide such inlet pressure information to the control system. The control system further comprises the motor control. With such configuration, the control system is structured and arranged to activate the vapor recovery unit, deactivate the vapor recovery unit, and, in embodiments comprising a variable frequency drive (VFD), alter the speed of the motor. Thus, the control system monitors inlet pressures, starts, stops, and, in case of VFD, alters the speed of the motor to maintain a low pressure set point in the vapor recovery vessel as determined by the operator. In the preferred embodiment, this low pressure set point is approximately .0625 PSIG (1 oz.). The control system is also adapted to monitor faults, run time efficiencies and alarms when an increase in flow is registered which may suggest a leaking or worn packing case causing excess vent. The operator can then open the 3-way valves individually to physically check which packing case is venting excessively and repair the packing case as needed to prevent excessive venting. This arrangement also prevents unnecessary repair on packing cases that are working properly but are past a scheduled rebuild cycle.

After recovering gas from the packing cases, the vapor recovery unit is adapted to discharge such gas through the discharge line to either sales or the reciprocating compressor inlet vessel or wherever else an operator might require in order to prevent venting to atmosphere.

In other embodiments, the FRS comprises an environmental tank. Environmental tanks or "pots" are commonly used in oil and gas operations near skids. Oil and water on such skids are gravity fed to the environmental tank. Conventionally, when the environmental tank becomes full, the tank is charged with pressurized natural gas to discharge the oil/water slurry into holding tanks. Conventionally, the charge gas is vented to the atmosphere. However, in the FRS of the present disclosure, the environmental tank gas is directed from the environmental tank through an environmental tank line into the main vapor recovery unit inlet line. Thus, the environmental tank gas can be recovered in similar manner as the packing case gas. In other embodiments, the FRS can be used to recover liquids from the environmental tank.

In other embodiments, the FRS comprises other components which emit gas which might ordinarily be vented to the atmosphere. A component vent line leading from such other components is provided. This component vent line feeds into the main vapor recovery unit inlet line. Thus, the component gas can be recovered in similar manner as the packing case gas.

In certain embodiments, the vent lines are fluidly connected to other elements upstream of the main vapor recovery unit inlet line such as the valves, environmental tanks, and other systems and components.

In certain embodiments, fluids are directed from the environmental tank through the environmental tank line into the main vapor recovery unit inlet line.

In certain embodiments, the FRS collects compressor "blow by gas", gas that escapes between the piston rod and the packing case through which the piston rod travels. In this system embodiment, a compressor frame vent line fluidly connects the compressor frame, directly or indirectly, to the main vapor recovery unit inlet line. The compressor frame vent line of this embodiment is directly connected to the main vapor recovery unit inlet line.

In certain embodiments, the FRS is fluidly connected to gas scrubber tanks of gas scrubbers that remove liquid from a gas stream and protect downstream equipment such as compressors. As liquids are incompressible, if a sufficient amount of liquid enters the compression chamber, the compressor can be severely damaged. The liquids separated from the gas stream are collected in the gas scrubber tank. The system of this embodiment collects gas that flashes or vaporizes from the liquid held in the gas scrubber tank. This gas collects at the top of the gas scrubber tank and is directed from the gas scrubber tank through a gas scrubber tank line, directly or indirectly, into the main vapor recovery unit inlet line. Although the system of this embodiment is directed at removing gas from the gas scrubber tank, the system is equally well suited from other vessels and tanks holding gas, or liquids and gas.

In certain embodiments, the FRS is fluidly connected to gas-actuated control components utilized in facility operation, such as dump valves, actuators and regulators. Such gas-actuated control components are commonly associated with a receiver tank holding gas, or liquids and gas. Gas from such arrangements is directed from the receiver tank through one or more receiver tank discharge lines, through the gas-actuated control components, through one or more gas-actuated control components lines, directly or indirectly, into the main vapor recovery unit inlet line.

In certain embodiments, the FRS is fluidly connected to gas engines used to power the compressors, pumps, generators or other units used in the operation of compression facilities. Similar to the blow-by gas discussed above with respect to reciprocating compressors, gas engines can experience blow-by wherein gasses escape through the seal (rings) between the piston and the cylinder. Engine blow-by gasses collect in the engine crankcase. Some blow-by is normal. Even in new engines, a certain amount of blow-by occurs. The system of this embodiment directs engine blow-by gas from the engine crankcase through an engine gas collection line, directly or indirectly, into the main vapor recovery unit inlet line.

In certain embodiments, the FRS is fluidly connected to one or more valves which receive gasses that are released, from, for example, the receiver tank during blow-down or depressurization of pressurized circuits and components used in the operation of compression facilities. The system of this embodiment directs gasses from the receiver tank through the receiver tank discharge line, through the valve, through a valve gas collection line, directly or indirectly, into the main vapor recovery unit inlet line. In preferred embodiments, the valve is a three-way ball valve.

In certain embodiments, the FRS collects gas from the compressor frame. The blow-by gas can be collected from the compressor frame through the vent line which fluidly connects the compressor frame to the main vapor recovery unit inlet line. In this embodiment, the fluids, such as vent gasses or liquids such as oil, from the compressor frame which acts as a sump can also, or alternatively, be sent through a bypass line which goes to the discharge line which leads to sales or the reciprocating compressor inlet vessel. Alternatively, the discharge line can lead to a further processing facility via processing facility conduit. In certain embodiments, bypass line leads to the receiver tank via sub-bypass line, the receiver tank functioning as will be discussed below.

In certain embodiments, the receiver tank separates and captures oil entrained in vents of the packing cases. This oil is then repurposed, recycled, or recovered for re-use in the compressor frame oil injection or sump system vents. The oil collected in this embodiment is directed from the receiver tank through a receiver tank conduit which fluidly connects the receiver tank to the main vapor recovery unit inlet line or, alternatively, to the bypass line which goes to the discharge line leading to sales or the reciprocating compressor inlet vessel. Alternatively, the discharge line can lead to a further processing facility via a processing facility conduit.

A method of determining whether packing within a packing case of a reciprocal compressor is in need of replacement and replacing the packing is also provided. The method of the preferred embodiment comprises the steps of providing a fluid recovery system comprising a reciprocating compressor, a reciprocating compressor inlet vessel, a vapor recovery unit, a control system, a vent line, a main vapor recovery unit inlet line, and a discharge line, the vent line comprising a valve; the vapor recovery unit comprising a vapor recovery vessel and a vapor recovery compressor comprising a motor, the main vapor recovery unit inlet line being fluidly connected to the vapor recovery vessel; the packing case fluidly connected to the vent line; the vent line valve being adapted to regulate a flow of packing case vapor through the vent line to the main vapor recovery unit inlet line or to atmosphere; the control system being adapted to monitor a vapor recovery vessel input pressure and a flow through the vapor recovery vessel, and to further control the vapor recovery compressor; and the control system being further adapted to control a vapor recovery vessel output to the discharge line, the discharge line being fluidly connected to the reciprocating compressor inlet vessel, the reciprocating compressor inlet vessel fluidly connected to the reciprocating compressor; using the control system, determining whether the flow of packing case vapor potentially exceeds an acceptable threshold; opening the vent line valve to atmosphere to determine whether the packing case vapor flow exceeds the acceptable threshold; and replacing the packing in the packing case upon determining that the packing case vapor flow exceeds the acceptable threshold.

DESCRIPTION OF THE PREFERRED EMBODIMENT

Figure 1:
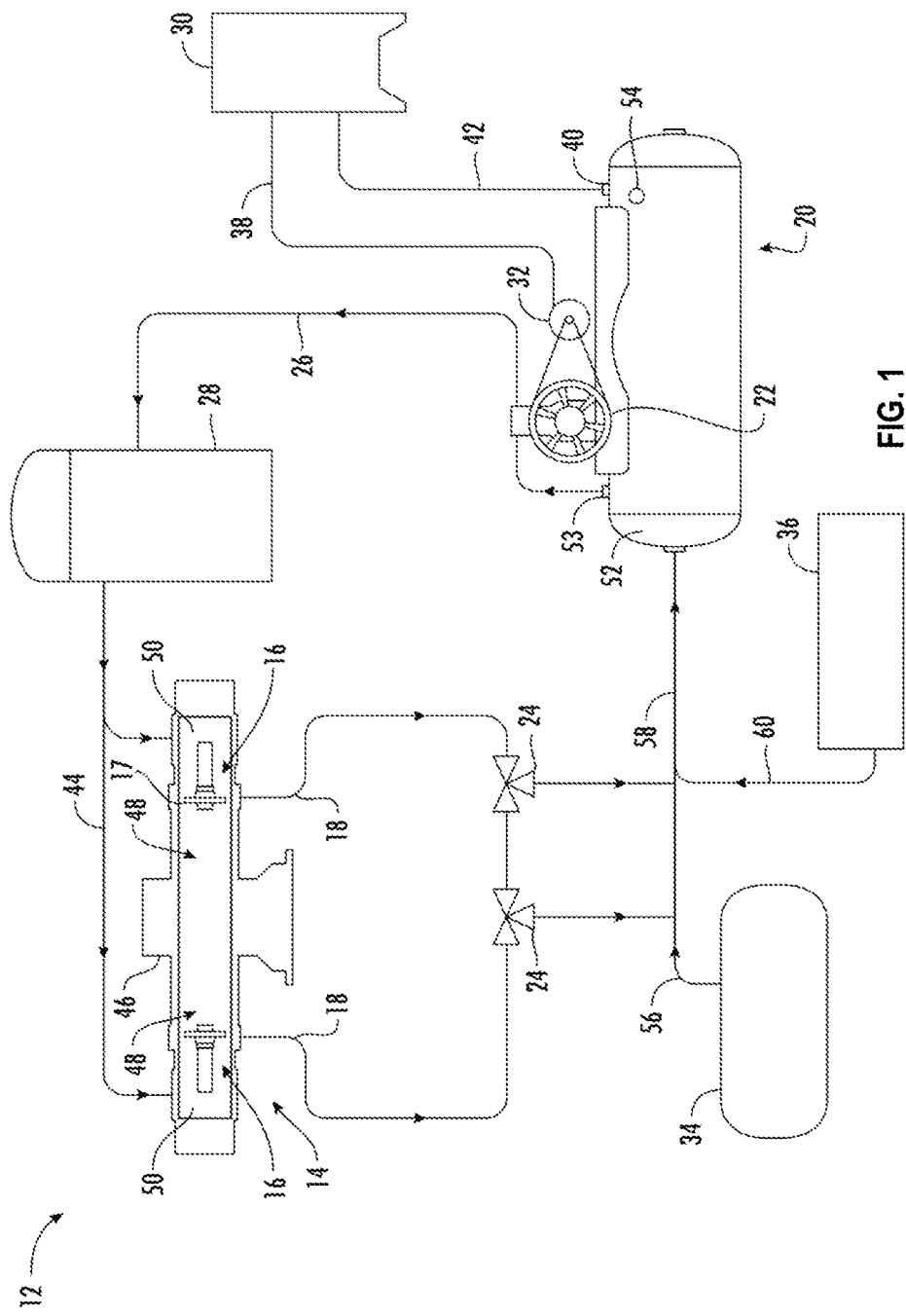
FIG. 1 is a block diagram depicting the fluid recovery system, in accordance with a preferred embodiment.
Figure 2:
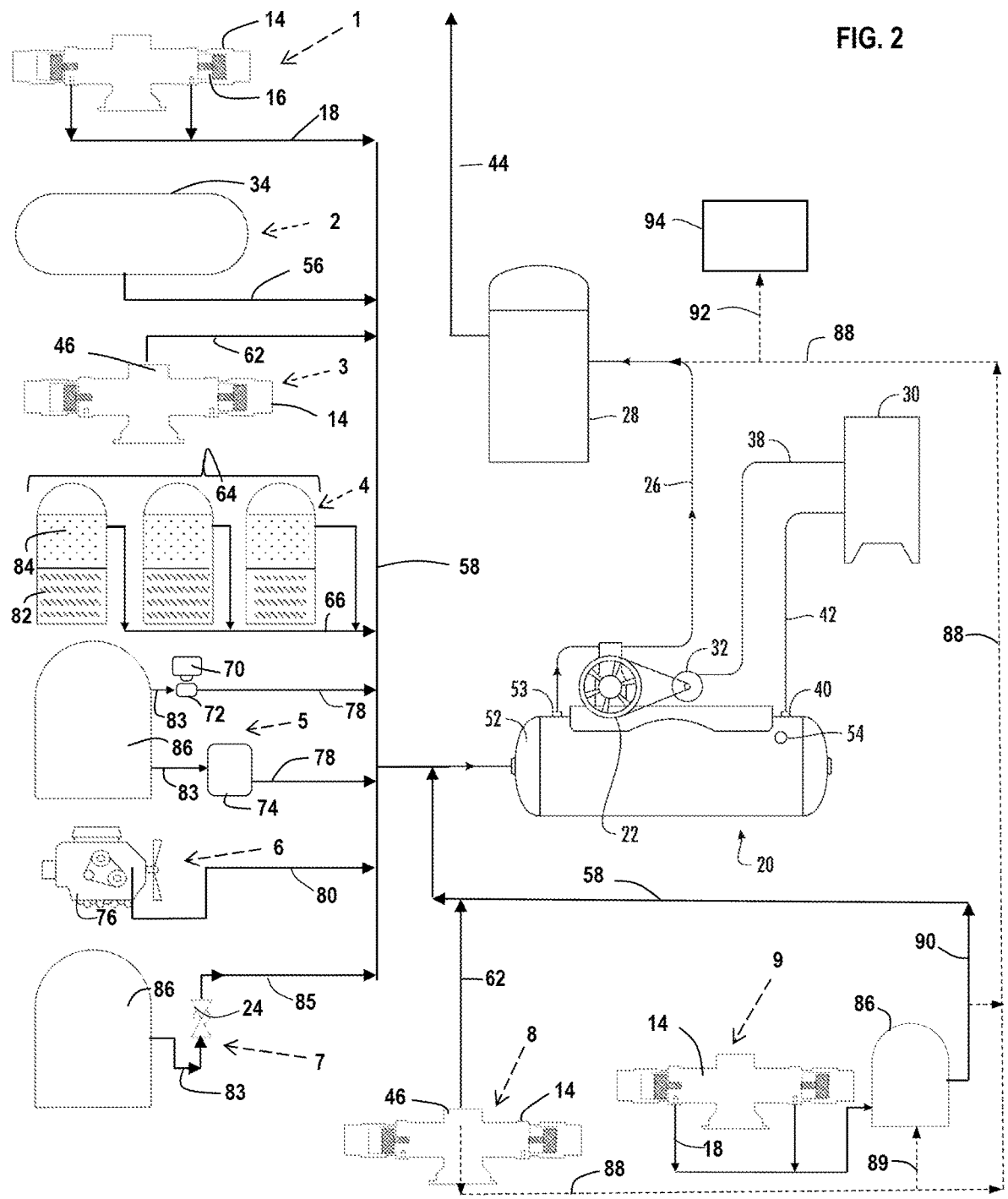
FIG. 2 is a conceptual flow diagram depicting various system components from which the fluid recovery system collects fluids, in accordance with preferred embodiments.

Referring to FIG. 1, there is shown the fluid recovery system (FRS) 12 in accordance with a preferred embodiment. FIG. 2 is a flow diagram depicting various system components from which the FRS collects fluids, in accordance with preferred embodiments. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

Referring to the figure, the FRS 12 of a preferred embodiment generally comprises a reciprocating compressor 14 comprising packing cases 16, packing vent lines 18 leading from the reciprocating compressor 14 to a main vapor recovery unit inlet line 58 leading into a vapor recovery unit 20 comprising a vapor recovery vessel 52 and a vapor recovery compressor 22 comprising a motor 32. The FRS 12 of the preferred embodiment further comprises one or more valves 24 adapted to regulate flow from the reciprocating compressor 14 to the vapor recovery unit 20; a discharge line 26 leading from the vapor recovery unit 20 to sales or a reciprocating compressor inlet vessel 28. The reciprocating compressor inlet vessel 28 is adapted to supply the reciprocating compressor 14 through inlet lines 44.

The FRS 12 of preferred embodiments further comprises a control system 30. The control system 30 of the preferred embodiment is a programmable logic controller (PLC) based controller adapted to monitor input devices and make program-based decisions to control output devices. In the preferred embodiment control system 30 is adapted to monitor and control the vapor recovery unit 20 and/or the motor 32 which in certain embodiments, comprises a variable frequency drive 32 communicatively linked to the control system 30 via motor control 38. In certain embodiments, the FRS 12 further comprises an environmental tank 34 and/or other components 36 which may emit gas such as dump valves, regulators, pumps, and the like. The vapor recovery unit 20 further comprises a pressure sensor/transducer 40 adapted to transmit inlet pressure readings to the control system 30 via communication conduit. The vapor recovery unit 20 further comprises a conventional and commercially available flow meter 53 adapted to measure and to transmit flow volume readings to the control system 30 via communication conduit 42. Such flow volume readings can be of flow entering the vapor recovery vessel 52 and/or exiting the vapor recovery vessel 52. Communication conduit 42 can be a physical conduit or wireless conduit or other suitable conventional and commercially available transmission conduit 42 well known in the art.

In operation, gas is fed from the reciprocating compressor inlet vessel 28 through the inlet lines 44 into the reciprocating compressor 14. The reciprocating compressor 14 comprises a frame 46 with packing cases 16 positioned within throws 48. Conventional reciprocating compressor frames 46 typically comprise between one to six throws 48, which will have a packing case 16 within each throw having a cylinder 50 installed. Gas accumulating within the packing cases 16 is directed downstream towards the vapor recovery unit 20 through the respective packing vent lines 18 (which in prior art reciprocating compressors are normally open to atmosphere). The valves 24 are positioned between the reciprocating compressor 14 and vapor recovery unit 20. In the preferred embodiment, the valves 24 are three-way ball valves 24 installed on each separate packing vent line 18 and are adapted to permit an operator to open the packing vent line 18 back to atmosphere to physically check the rate of vent flow from the packing case 16.

The vapor recovery unit 20 further comprises required sensors and hardware to operate the vapor recovery vessel 52, the vapor recovery compressor 22, and the motor 22. The vapor recovery vessel 52 of the preferred embodiment comprises a controllable relief valve 54 adapted to be configured to a setting that will permit gas to vent to atmosphere should a shutdown occur in the vapor recovery unit 20. This setting can be adjusted based on the operator's preference in order, for example, to maintain a packing case 16 vent pressure within accepted operating parameters. These accepted operating parameters may be determined, for example by the reciprocating compressor 14 manufacturer. In conventional reciprocating compressors 14, the acceptable packing case 16 vent pressure is typically below 5 pounds per square inch gauge pressure (PSIG).

The vapor recovery compressor 22 of the preferred embodiment is a conventional and commercially available small reciprocating or rotary type compressor adapted to operate with very low inlet pressure as well as low discharge pressure such that recovered gas can be routed back into the low pressure side of the FRS 12 or the sales line 26.

The pressure sensor/transducer 40 is used to monitor inlet pressure to the vapor recovery vessel 52 and provide such inlet pressure information to the control system 30. The control system 30 further comprises the motor control 38. With such configuration, the control system 30 is structured and arranged to, among other things, activate the vapor recovery unit 20, deactivate the vapor recovery unit 20, and, in embodiments comprising a variable frequency drive (VFD) 32, alter the speed of the motor 32. Thus, the control system 30, for example, monitors inlet pressures, flow rates, starts, stops, and, in case of a VFD, alters the speed of the motor 32 to, for example, maintain a low pressure set point in the vapor recovery vessel 52 as determined by the operator, and to maintain operation within certain pressure parameters. In the preferred embodiment, this low pressure set point (stop setting) is approximately 1 oz (0.0625 PSIG). In the preferred embodiment, the system 12 is controlled such that an operating input pressure VFD set point is 3 oz (0.1875 PSIG) and has a start setting of 5 oz. (0.3125 PSIG). The relief valve 54 of the preferred embodiment is weighted and activates at 12 oz. (0.75 PSIG) when, for example, the vapor recovery unit 20 is shut off or flow is altered for any reason.

The control system 30 is also adapted to monitor faults, run time efficiencies and alarms when, for example, an increase in flow is registered (as determined, for example by pressure readings and/or flow rate readings) which may suggest a leaking or worn packing case 16 causing excess vent from the packing case. The operator can then open the 3-way valves 24 individually to physically check which packing case 16 is venting excessively and repair the packing case 16 as needed to prevent excessive venting. This arrangement also prevents unnecessary repair on packing cases 16 that are working properly but are past a scheduled rebuild cycle.

After recovering gas from the packing cases 16, the vapor recovery unit 20 is adapted to discharge such gas through the discharge line 26 to either sales or the reciprocating compressor inlet vessel 28 or wherever else an operator might require in order to prevent venting to atmosphere.

In other embodiments, the FRS 12 comprises an environmental tank 34. In such embodiments, environmental tank 34 gas is directed from the environmental tank 34 through an environmental tank line 56 into the main vapor recovery unit inlet line 58. Thus, the environmental tank 34 gas can be recovered in similar manner as the packing case 16 gas. In other embodiments, liquids contained in the environmental tank 34 can be sent to a receiver tank 86 and processed as provided herein.

In other embodiments, the FRS 12 comprises other components 36 which emit fluids which might ordinarily be vented to the atmosphere. A component vent line 60 leading from such other components 36 is provided. This component vent line 60 feeds into the main vapor recovery unit inlet line 58. Thus, the component 34 gas can be recovered in similar manner as the packing case 16 gas.

Referring to FIG. 2, there are shown nine system embodiments 1-9, that will be discussed in further detail below (each system being referenced numerically with a dashed callout arrow).

System embodiment 1 relates to collecting vent gas from the packing cases 16 as has been set forth in detail above. In FIG. 2, system embodiment 1 is shown with the vent lines 18 fluidly connected directly to the main vapor recovery unit inlet line 58. Of course, as described above, the vent lines 18 can be fluidly connected to other elements upstream of the main vapor recovery unit inlet line 58 such as the valves 24, environmental tanks 34, and other systems and components.

Referring to system embodiment 2, the FRS 12 comprises the environmental tank 34 discussed above. The environmental tank 34 in gas compression operations is a collection tank that is supplied fluids such as oil and gas that has been released or has discharged from other machinery and equipment (such as the compressor skid). Such fluid would, without such environmental tank 34, spill over to the ground and potentially cause environmental damage. In system embodiment 2, the environmental tank 34 gas is directed from the environmental tank 34 through the environmental tank line 56 into the main vapor recovery unit inlet line 58. In other embodiments, liquids contained in the environmental tank 34 can be sent to a receiver tank 86 and processed as provided herein.

Referring to system embodiment 3 depicted in FIG. 2, in such embodiment, the FRS 12 collects gas from the compressor frame 46. The gas collected from the compressor frame 46 of system embodiment 3 is "blow by gas". Blow-by gas is gas that escapes between the piston rod and the packing case 16 through which the piston rod travels. In this system embodiment, a compressor frame vent line 62 fluidly connects the compressor frame, directly or indirectly, to the main vapor recovery unit inlet line 58. In the embodiment shown in FIG. 2, the compressor frame vent line 62 is directly connected to the main vapor recovery unit inlet line 58.

Referring to system embodiment 4 depicted in FIG. 2, the FRS 12 is fluidly connected to gas scrubber tanks 64. Gas scrubbers remove liquid 82 from a gas stream and protect downstream equipment such as compressors. As liquids are incompressible, if a sufficient amount of liquid enters the compression chamber, the compressor can be severely damaged. The liquids 82 separated from the gas stream are collected in the gas scrubber tank 64. The system of system embodiment 4 collects gas 84 that flashes or vaporizes from the liquid held in the gas scrubber tank 64. This gas 84 collects at the top of the gas scrubber tank 64 and is directed from the gas scrubber tank 64 through a gas scrubber tank 64 line 66, directly or indirectly, into the main vapor recovery unit inlet line 58. Although the system embodiment 4 is directed at removing gas 84 from the gas scrubber tank 64, the system is equally well suited from other vessels and tanks holding gas, or liquids and gas.

Referring to system embodiment 5 depicted in FIG. 2, the FRS 12 is fluidly connected to gas-actuated control components utilized in facility operation, such as dump valves 74, actuators 70 and regulators 72. Such gas-actuated control components 70, 72, 74 are commonly associated with a receiver tank 86 holding gas, or liquids and gas. Gas from such arrangements is directed from the receiver tank 86 through one or more receiver tank discharge lines 83, through the gas-actuated control components, through one or more gas-actuated control components lines 78, directly or indirectly, into the main vapor recovery unit inlet line 58.

Referring to system embodiment 6 depicted in FIG. 2, the FRS 12 is fluidly connected to gas engines 76 used to power the compressors, pumps, generators or other units used in the operation of compression facilities. Similar to the blow-by gas discussed above with respect to reciprocating compressors 14, gas engines can experience blow-by wherein gasses escape through the seal (rings) between the piston and the cylinder. Engine blow-by gasses collect in the engine crankcase. Some blow-by is normal. Even in new engines, a certain amount of blow-by occurs. The system of system embodiment 6 directs blow-by gas from the engine crankcase through an engine gas collection line 80, directly or indirectly, into the main vapor recovery unit inlet line 58.

Referring to system embodiment 7 depicted in FIG. 2, the FRS 12 is fluidly connected to one or more valves 24 which receive gasses that are released, from, for example, the receiver tank 86 during blow-down or depressurization of pressurized circuits and components used in the operation of compression facilities. The system of system embodiment 7 directs gasses from the receiver tank 86 through the receiver tank discharge line 83, through valve 24, through a valve gas collection line 85, directly or indirectly, into the main vapor recovery unit inlet line 58. In the preferred embodiment, the valve 24 is a three-way ball valve 24.

Referring to system embodiment 8 depicted in FIG. 2, the FRS 12 collects gas from the compressor frame 46. As mentioned with respect to system embodiment 3, the blow-by gas can be collected from the compressor frame 46 through the vent line 62 which fluidly connects the compressor frame to the main vapor recovery unit inlet line 58. In the system of system embodiment 8 shown in FIG. 2, the vent gasses or liquids, such as oil, from the compressor frame 46 which acts as a sump can also, or alternatively, be sent through bypass line 88 which goes to discharge line 26 which leads to sales or the reciprocating compressor inlet vessel 28. Alternatively, the discharge line 26 can lead to a further processing facility 94 via processing facility conduit 92. In certain embodiments, bypass line 88 leads to the receiver tank 86 via sub-bypass line 89, the receiver tank 86 functioning as will be discussed below with respect to system embodiment 9.

Referring to system embodiment 9 depicted in FIG. 2, in this embodiment, the receiver tank 86 separates and captures oil entrained in vents of the packing cases 16. This oil is then repurposed, recycled, or recovered for re-use in the compressor frame oil injection or sump system vents. The oil collected in this embodiment is directed from the receiver tank 86 through a receiver tank conduit 90 which fluidly connects the receiver tank 86 to the main vapor recovery unit inlet line 58 or, alternatively, to the bypass line 88 which goes to the discharge line 26 leading to sales or the reciprocating compressor inlet vessel 28. Alternatively, the discharge line 26 can lead to a further processing facility 94 via processing facility conduit 92.

A method of determining whether packing 17 within a packing case 16 of a reciprocal compressor 14 is in need of replacement and replacing the packing 17 is also provided. The method of the preferred embodiment comprises the steps of providing a fluid recovery system 12 comprising a reciprocating compressor 14, a reciprocating compressor inlet vessel 28, a vapor recovery unit 20, a control system 30, a vent line 18, a main vapor recovery unit inlet line 58, and a discharge line 26, the vent line 18 comprising a valve 24; the vapor recovery unit 20 comprising a vapor recovery vessel 52 and a vapor recovery compressor 22 comprising a motor 32, the main vapor recovery unit inlet line 58 being fluidly connected to the vapor recovery vessel 52; the packing case 16 fluidly connected to the vent line 18; the vent line valve 24 being adapted to regulate a flow of packing case vapor through the vent line 18 to the main vapor recovery unit inlet line or to atmosphere; the control system 30 being adapted to monitor a vapor recovery vessel input pressure and a flow through the vapor recovery vessel 52, and to further control the vapor recovery compressor 22; and the control system 30 being further adapted to control a vapor recovery vessel output to the discharge line 26, the discharge line 26 being fluidly connected to the reciprocating compressor inlet vessel 28, the reciprocating compressor inlet vessel 28 fluidly connected to the reciprocating compressor; using the control system 30, determining whether the flow of packing case vapor potentially exceeds an acceptable threshold; opening the vent line valve 24 to atmosphere to determine whether the packing case vapor flow exceeds the acceptable threshold; and replacing the packing 17 in the packing case 16 upon determining that the packing case vapor flow exceeds the acceptable threshold.

The foregoing disclosure and showings made in the drawing are merely illustrative of the principles of this invention and are not to be interpreted in a limiting sense.

I claim:

1. A fluid recovery system comprising:
 a vapor recovery unit, a control system, a compressor frame vent line, a packing case vent line, a main vapor recovery unit inlet line, and a discharge line;
 the vapor recovery unit comprising a vapor recovery vessel and a vapor recovery compressor comprising a motor, the main vapor recovery unit inlet line being fluidly connected to the vapor recovery vessel;
 the packing case vent line comprising a valve adapted to regulate a flow of packing case vapor through the packing case vent line to the main vapor recovery unit inlet line;
 the compressor frame vent line being adapted to permit a flow of blow-by gas through the compressor frame vent line to the main vapor recovery unit inlet line:
 the control system being adapted to monitor a vapor recovery vessel input pressure and control the vapor recovery compressor; and
 the control system being further adapted to control a vapor recovery vessel output to the discharge line.

2. The fluid recovery system of claim 1, wherein the packing case vapor originates in a reciprocating compressor.

3. The fluid recovery system of claim 1, wherein the packing case vent line valve comprises a three-way valve adapted to selectively divert flow from the vent line to atmosphere.

4. A fluid recovery system comprising:
 a reciprocating compressor, a vapor recovery unit, a control system, a compressor frame vent line, a packing case vent line, a main vapor recovery unit inlet line, and a discharge line, the packing case vent line comprising a valve;
 the vapor recovery unit comprising a vapor recovery vessel and a vapor recovery compressor comprising a motor, the main vapor recovery unit inlet line being fluidly connected to the vapor recovery vessel;

the reciprocating compressor being fluidly connected to the compressor frame vent line and the packing case vent line;

the packing case vent line valve being adapted to regulate a flow of packing case vapor through the vent line to the main vapor recovery unit inlet line;

the compressor frame vent line being adapted to permit a flow of blow-by gas through the compressor frame vent line to the main vapor recovery unit inlet line;

the control system being adapted to monitor a vapor recovery vessel input pressure and control the vapor recovery compressor; and the control system being further adapted to control a vapor recovery vessel output to the discharge line, the discharge line being fluidly connected to the reciprocating compressor inlet vessel, the reciprocating compressor inlet vessel fluidly connected to the reciprocating compressor.

5. The fluid recovery system of claim 4, wherein the packing case vapor comprises blow-by gas.

6. The fluid recovery system of claim 4 further comprising an environmental tank and an environmental tank line, the environmental tank line fluidly connecting the environmental tank to the main vapor recovery unit inlet line.

7. The fluid recovery system of claim 4 further comprising:
gas scrubbers comprising a gas scrubber tank, the gas scrubber tank structured and arranged to contain vapor from a gas scrubbing operation;
a gas scrubber tank line;
the gas scrubber tank line fluidly connecting the gas scrubber tank to the main vapor recovery unit inlet line.

8. The fluid recovery system of claim 4 further comprising:
a receiver tank, the receiver tank being fluidly connected to the main vapor recovery unit inlet line.

9. The fluid recovery system of claim 8, further comprising:
one or more gas-actuated control components, the gas-actuated control components being fluidly connected to the receiver tank and the main vapor recovery unit inlet line.

10. The fluid recovery system of claim 9, the one or more gas-actuated control components, comprising a dump valve or an actuator, or a regulator.

11. The fluid recovery system of claim 8, further comprising:
a receiver tank valve fluidly connected to the receiver tank, the receiver tank valve structured and arranged to regulate a flow of vapor released from the receiver tank;
the receiver tank valve being fluidly connected to the main vapor recovery unit inlet line.

12. The fluid recovery system of claim 4 further comprising:
an engine and an engine gas collection line, the engine containing engine blow-by gas;
the engine being fluidly connected to the main vapor recovery unit inlet line.

13. The fluid recovery system of claim 4, the reciprocating compressor being fluidly connected to a bypass line, the bypass line being fluidly connected to the discharge line such that fluid flowing through the bypass line does not enter the main vapor recovery unit inlet line.

14. The fluid recovery system of claim 4, further comprising:
a receiver tank fluidly connected to the reciprocating compressor;
the receiver tank being structured and arranged to receive oil entrained in vents of packing cases of the reciprocating compressor;
the receiver tank being further structured and arranged to separate the received oil into liquids and vapor;
the receiver tank being fluidly connected to the main vapor recovery unit inlet line.

15. The fluid recovery system of claim 14 further comprising a bypass line; the bypass line being structured and arranged to permit the liquid to be transmitted from the receiver tank for further processing or sale.

16. A fluid recovery system comprising:
a reciprocating compressor, a vapor recovery unit, a control system, a vent line, a main vapor recovery unit inlet line, and a discharge line, the vent line comprising a valve;
the vapor recovery unit comprising a vapor recovery vessel and a vapor recovery compressor comprising a motor, the main vapor recovery unit inlet line being fluidly connected to the vapor recovery vessel;
the reciprocating compressor being fluidly connected to the vent line;
the vent line valve being adapted to regulate a flow of reciprocating compressor vapor through the vent line to the main vapor recovery unit inlet line;
gas scrubbers comprising a gas scrubber tank, the gas scrubber tank structured and arranged to contain vapor from a gas scrubbing operation;
a gas scrubber tank line;
the gas scrubber tank line fluidly connecting the gas scrubber tank to the main vapor recovery unit inlet line;
a receiver tank, the receiver tank being fluidly connected to the main vapor recovery unit inlet line;
a receiver tank valve fluidly connected to the receiver tank, the receiver tank valve structured and arranged to regulate a flow of vapor released from the receiver tank;
one or more gas-actuated control components, the gas-actuated control components being fluidly connected to the receiver tank and the main vapor recovery unit inlet line;
an engine and an engine gas collection line, the engine containing engine blow-by gas and being fluidly connected to the main vapor recovery unit inlet line;
an environmental tank and an environmental tank line, the environmental tank line fluidly connecting the environmental tank to the main vapor recovery unit inlet line;
the control system being adapted to monitor a vapor recovery vessel input pressure and control the vapor recovery compressor; and
the control system being further adapted to control a vapor recovery vessel output to the discharge line, the discharge line being fluidly connected to the reciprocating compressor inlet vessel, the reciprocating compressor inlet vessel fluidly connected to the reciprocating compressor.

17. The fluid recovery system of claim 16, the one or more gas-actuated control components, comprising a dump valve or an actuator, or a regulator.

18. The fluid recovery system of claim 16, the reciprocating compressor being fluidly connected to a bypass line, the bypass line being fluidly connected to the discharge line such that fluid flowing through the bypass line does not enter the main vapor recovery unit inlet line.

19. The fluid recovery system of claim 18,
the receiver tank being fluidly connected to the reciprocating compressor;
the receiver tank being structured and arranged to receive oil entrained in vents of packing cases of the reciprocating compressor;
the receiver tank being further structured and arranged to separate the received oil into liquids and vapor;
the receiver tank being fluidly connected to the bypass line.

\* \* \* \* \*